United States Patent [19]

Deeg

[11] Patent Number: 5,542,311
[45] Date of Patent: Aug. 6, 1996

[54] TOOTHED-WHEEL GEAR WITH PARALLEL SHAFTS

[75] Inventor: Thomas Deeg, Seuzach, Switzerland

[73] Assignee: Maag Getriebe AG, Switzerland

[21] Appl. No.: 283,521

[22] Filed: Aug. 1, 1994

[30] Foreign Application Priority Data

Jul. 30, 1993 [EP]  European Pat. Off. ............ 93112220.4

[51] Int. Cl.⁶ ...................................................... F16H 57/00
[52] U.S. Cl. ............................................................ 74/410
[58] Field of Search ................................................. 74/410

[56] References Cited

U.S. PATENT DOCUMENTS 3,036,475  5/1962  Haupt ........................................ 74/410
3,381,509  5/1968  Gay ........................................... 74/410
4,312,244  1/1982  Barnes et al. ............................. 74/410

*Primary Examiner*—Allan D. Herrmann
*Attorney, Agent, or Firm*—Laurence R. Brown

[57] ABSTRACT

The toothed-wheel gear with parallel shafts and load branching comprises a driving wheel (1), intermediate wheels (2;2') and a power wheel (3), wherein the driving wheel is guided between the intermediate wheels (2), e.g. in guide bearings (4), in such a manner that the driving wheel (1) can self-shift, in operation, along a plane inclined by an angle ($\alpha$) and axis parallel to a plane containing the axis of the driving wheel and the power wheel, to such an extent that the balance of forces is reestablished.

5 Claims, 3 Drawing Sheets

TOOTHED-WHEEL GEAR WITH PARALLEL SHAFTS

BACKGROUND OF THE INVENTION

1. Field of the Invention

The present invention relates to a toothed-wheel gear with parallel shafts with load branching, having a driving shaft with a driving wheel which meshes with intermediate wheels of two intermediate shafts, the latter driving directly by means of pinions or over further intermediate shafts a power shaft.

2. Description of the Prior Art

Gears with load or power branching are preferably provided where a high power density, low weight and small sizes are asked for. Classic solutions are planetary gears in which the total power to be transmitted is distributed on at least three meshing teeth. However, for a great number of applications such a planetary gear is no longer suitable, such as for extreme high-speed gears with high power or for marine gears requiring a high degree of quietness.

For such type of applications toothed-wheel gears with parallel shafts are e.g. constructed having a double power branching. In such gears a driving wheel is driving, by means of two intermediate wheels, a common power wheel whereby the driving power is divided on the two teeth meshings with said intermediate wheels. Such gears may be constructed as multistage gears using the same principle. The basic problem in gears of this type is to distribute the total power uniformly, i.e. by 50% each on the two power paths. However, due to manufacturing tolerances in the toothings, the shafts and the bearings, as well as misalignment of shafts and thermal deformations during operation, the required power distribution could only be reached accidentally if no appropriate supplementary measures are taken. As the stiffness of each individual tooth meshing is much too great to be able to compensate the described influences, such gears need constructive corrections in order to reach a uniform power distribution.

The standard solution in two-stage gears, as mainly in use in marine vehicles with turbine drive, consists in the connection of the intermediate wheels of the first stage with the pinions of the second stage by means of torsion-elastic torsion shafts. However, such a construction asks for four radial bearings for each intermediate shaft, hollow wheels and pinions, as well as a torsion shaft and, at least in the case of a herringbone gearing (double helical gearing) an additional axially yielding element. Such a solution is therefore quite complicated and expensive.

An other solution is e.g. described in DE-A-2363 968. In this known construction, the driving wheel is provided with adjusting means comprising movably supported bearings of the driving wheel. The mobility or flexibility required is achieved by means of a swivel arm, tilting or sliding shoes or by an appropriate arrangement of a radial tilting segment bearing. This asks in any case for an additional constructional expenditure. Furthermore, there appear, in operation, restoring forces which produce in the moving mechanism frictional forces. These known expensive solutions can be used for single or multi-stage gears.

SUMMARY OF THE INVENTION

It is therefore an object of the present invention to provide a toothed-wheel gear with parallel shafts and load branching in which an optimal load balancing can be realized without a complicated and expensive additional mechanism and which can be used in single, as well as multi-stage gears. A solution according to the present invention comprises a toothed-wheel gear with parallel shafts of the kind described above in which the driving wheel is arranged and guided between the intermediate wheels in such a manner that the driving wheel with its shaft is self-shiftable in a plane axially parallel but inclined by an angle $\alpha$ with respect to the plane of the shafts of the driving wheel and power wheel until the balance of the forces and thus the balance of the loads is reached.

The balance of the loads in such a construction is reached in that the guides or guiding bearings of the driving shaft, which with a good load distribution is practically not subject to any forces, are constructed in such a manner that the driving shaft in its guide occupies automatically its preferred position of the balance of the forces.

Preferred embodiments of the gear according to the invention are defined in the dependent claims.

The guidance of the driving wheel may particularly be made without specific guide bearings between the intermediate wheels and the driving wheel or by means of a specifically constructed guide bearing ("lemon bearing").

The gear in accordance with the present invention is particularly suitable as a reduction gear for driving marine propellers.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 illustrates a single-stage gear with a driving wheel 1 provided exactly in the plane of the axis $A_1$, $A_2$ of the intermediate wheels 2. These intermediate wheels 2 are meshing with the power wheel 3. If the load is ideally distributed on each of the two tooth meshings $E_1$ and $E_2$ the tooth forces $Z_1$ and $Z_2$ on the driving wheel 1 are of exactly the same size but of opposed direction, i.e. the driving wheel 1 is in principle free of forces.

In practice the backlash or play in the individual toothings is variable, as are the plays in the bearings and the diameters of the shafts. Also to be noticed are variable shiftings of the intermediate wheels 2 in their shaft bearings, as well as thermal influences. Therefore the balance of forces at the driving wheel 1 does not occur automatically if one uses a conventional bearing of the driving wheel 1. Although the driving wheel 1 has the tendency to reach the state of balanced forces, it could not or only in an insufficient manner shift the center point $A_0$ of its axis to the required extent if it is equipped with a conventional bearing.

Figures 1, 1A:
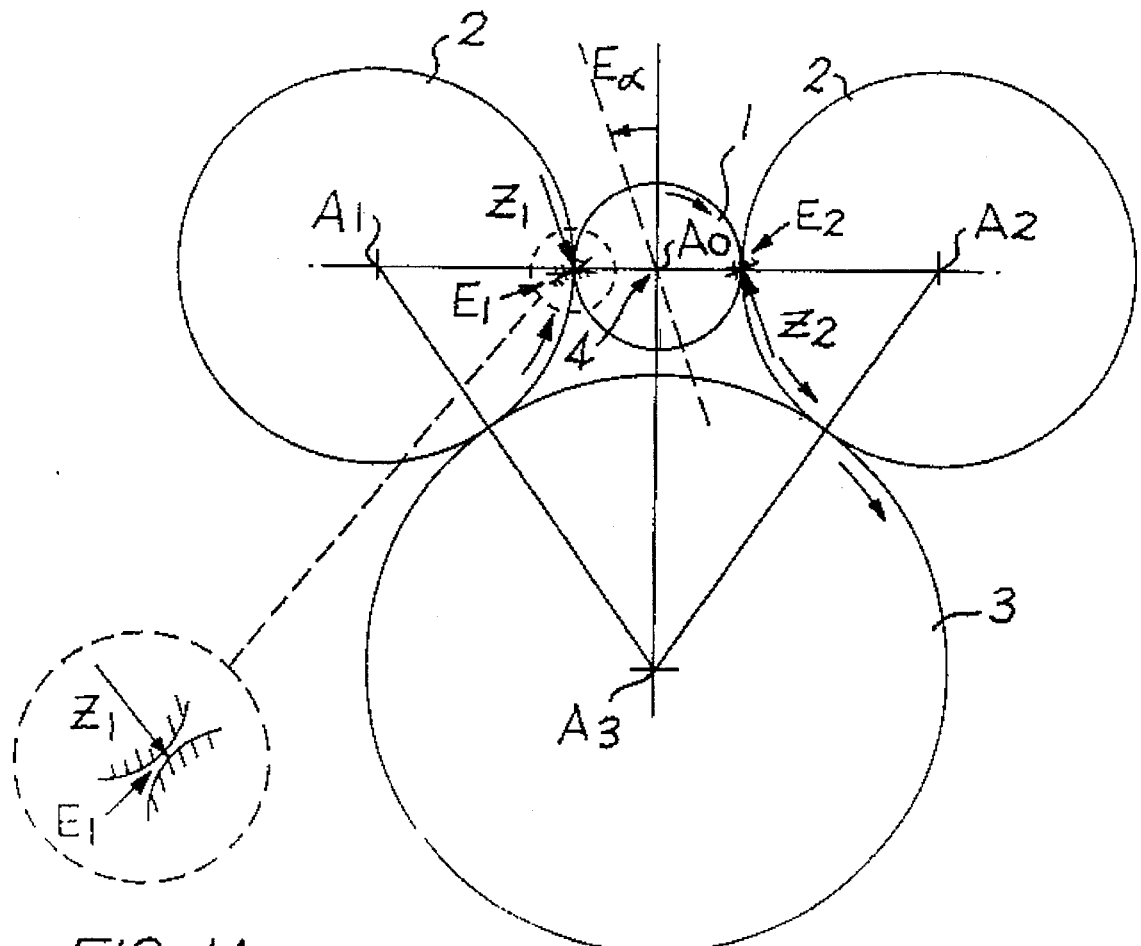
FIG. 1 illustrates purely schematically a toothed-wheel gear with parallel shafts, with a driving wheel, two load distributing intermediate wheels and a power wheel.
FIG. 1A is an enlarged view of the corresponding circled region in FIG. 1.
Figure 2A:
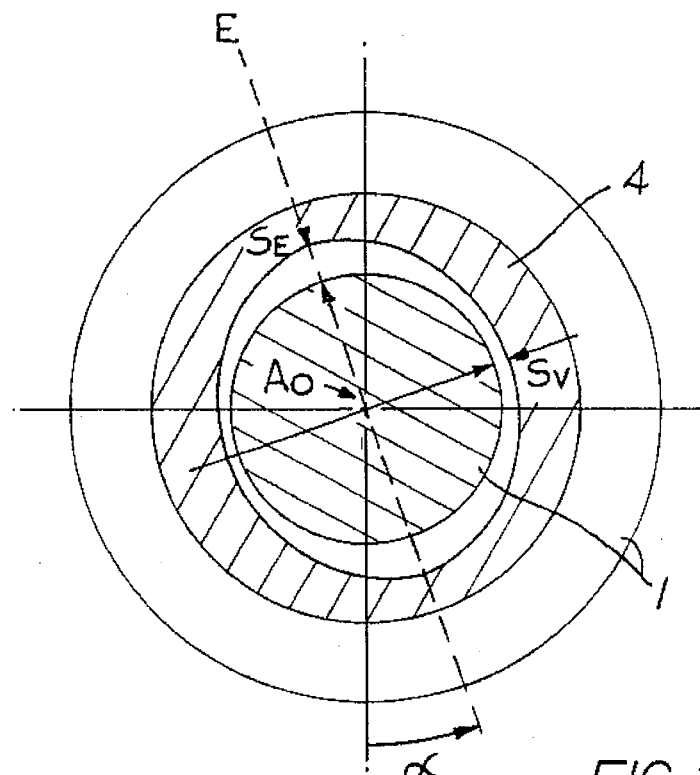
FIG. 2a show a guide bearing for the shaft of the driving and 2b wheel.
Figure 2B:
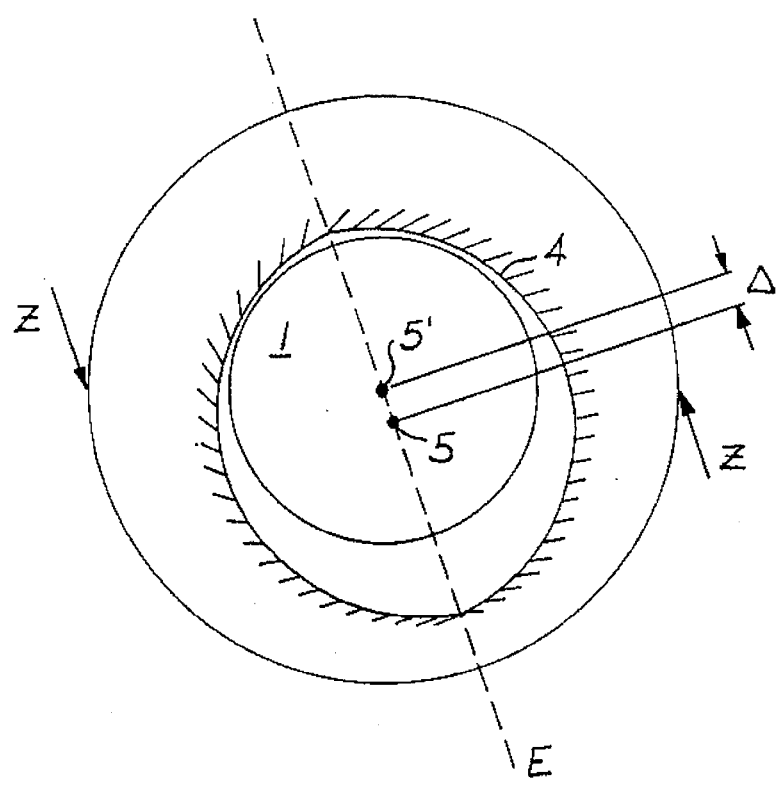

The present invention assumes that in a gear according to FIG. 1, the driving wheel 1 is practically free of forces if the load is well divided. This means nothing else than that the bearings of the driving wheel 1 form only a guidance of the wheel, e.g. guide bearings, which may present a bearing geometry deviating from the usual bearing theory. This provides for the possibility to construct the bearings of the driving wheel 1 in such a manner that the center point $A_0$ of the shaft can shift within the fixed bearing until the desired balance of the forces is reached. The shifting of the center point $A_0$ of the shaft of the driving wheel 1 is the most effective in a plane E including to the axis which is inclined by an angle $\alpha$ with respect to the plane containing the axis of the driving wheel 1 and the power wheel 3. The angle $\alpha$ preferably is identical with the tooth pressure angle. FIG. 2a illustrates an embodiment of a guide bearing 4 of the driving wheel 1 of a gear in accordance with the invention. The bearing geometry corresponds as to its shape to a so-called "lemon bearing". The backlash $S_E$ has to be chosen great enough so as to enable to compensate, by means of a compensating shifting of the center point $A_0$ of the driving wheel 1 in the plane E, all effects appearing during operation which could lead to a non-uniform distribution of the load at the driving wheel. As illustrated by FIG. 2b, the center point 5 of the shaft shifts from its geometrical position into its operating position 5' in which the forces are balanced equivalent to an ideal distribution of the load. The shifting $\Delta$ compensates all former influences, such as non-uniform backlashes etc. The play $S_v$ in the bearing in a vertical direction to the plane E may be chosen small, this in accordance with conventional bearing play theories. It serves to a proper "lateral" guidance of the driving wheel 1.

Figure 3:
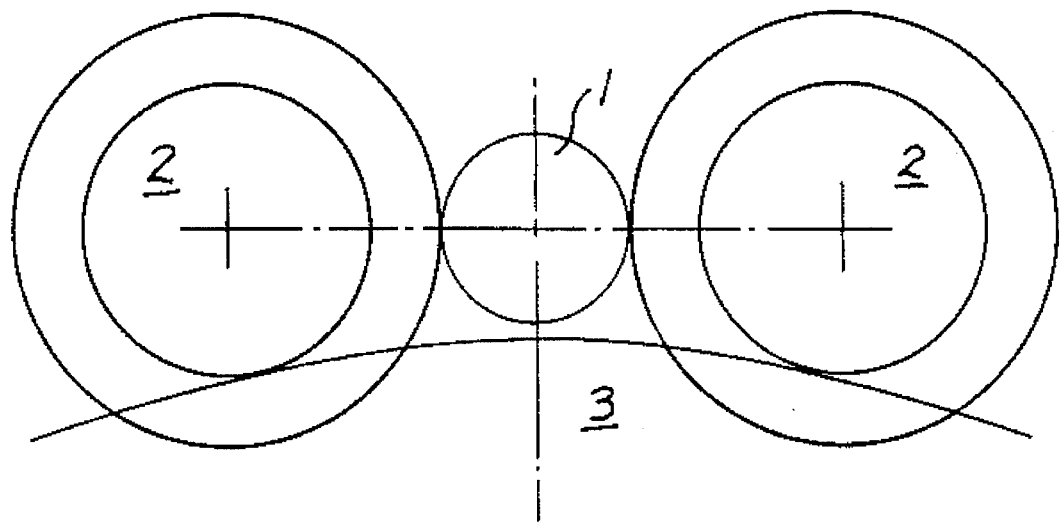
FIG. 3 illustrates schematically a front view of a variant of the gear as shown in FIG. 1, and FIG. 4 a top view, on a reduced scale, of the gear according to FIG. 3.
Figure 4:
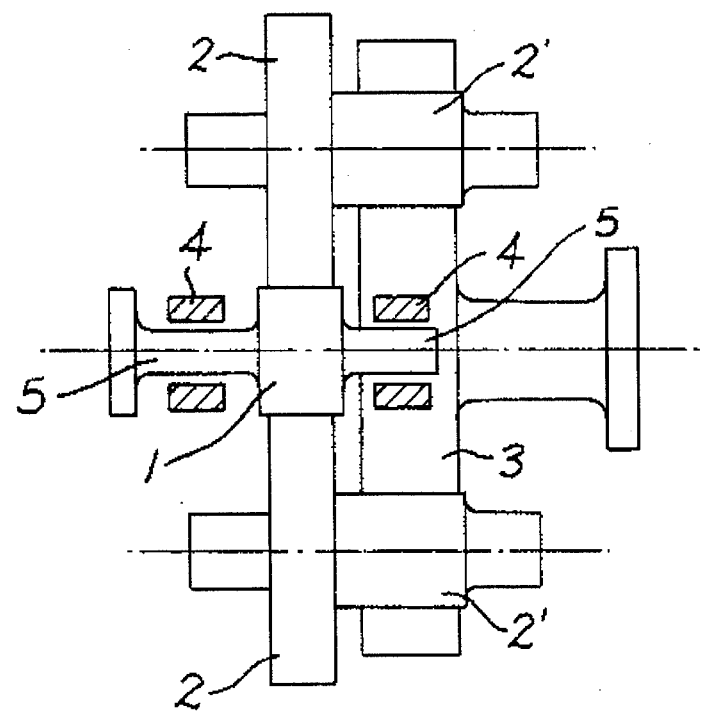

FIG. 3 and 4 illustrates a two-stage load branched marine gear built up in accordance with the present invention. For parts corresponding to those represented in FIG. 1 corresponding reference numerals were used. The resulting advantages clearly appear, namely: Short construction, low weight and a small number only of intermediate bearings as well as the mechanical means for load distribution.

The second stage is formed by wheels 2', fixedly connected to the intermediate wheels 2 or integrally formed therewith, which are finally meshing with the power wheel 3. The shaft 5 of the driving wheel 1 is guided in bearings 4, e.g. in accordance with FIG. 2a and 2b.

A variant of the invention completely renounces to the guide bearings 4 for the driving wheel 1. This is principally possible because the load branched gear forms a closed train of wheels from which the driving wheel 1 can not escape as it is fixed or enclosed respectively by the intermediate wheels 2 and the power wheel 3 by their toothing.

I claim:

1. A toothed-wheel gear with parallel shafts and load branching, comprising a driving shaft, guide bearings and a driving wheel meshing with intermediate wheels of two intermediate shafts which drive a power wheel, wherein said driving wheel is arranged and guided between said intermediate wheels in such a manner that the driving wheel with its shaft can self-shift in a plane including the shaft axis and inclined by an angle $\alpha$ with respect to a plane containing the axis of the driving wheel and the power wheel to such an extent that the balance of the forces and thereby the balance of the load is reestablished, and wherein the guide bearings of the driving wheel have a greater play in the direction of said inclined plane than in a direction of a plane extending vertically with respect to said inclined plane.

2. The gear of claim 1, wherein the driving wheel with its axis is arranged in the same plane as the axis of said intermediate wheels and wherein the guide bearings of the driving wheel are constructed such that the driving wheel can self-shift along said inclined plane to such an extent that the balance of the loads is reached.

3. The gear of claim 1, wherein the inclination angle of said inclined plane is the same as the pressure angle of the teeth.

4. The gear of claim 1, wherein it forms a two-or multi-stage gear.

5. The gear of claim 1 for use as a reduction gear for driving a marine propeller.

* * * * *